US010478709B2

(12) United States Patent
Goehring, Jr. et al.

(10) Patent No.: US 10,478,709 B2
(45) Date of Patent: Nov. 19, 2019

(54) TERRESTRIAL WAKEBOARD (71) Applicant: Tommy Board, Inc., Westlake Village, CA (US)

(72) Inventors: Tom Goehring, Jr., Newport Beach, CA (US); Jason Rogers, Discovery Bay, CA (US)

(73) Assignee: TOMMY BOARD, INC., Huntington Beach, CA (US)

( * ) Notice: Subject to any disclaimer, the term of this patent is extended or adjusted under 35 U.S.C. 154(b) by 0 days.

(21) Appl. No.: 16/000,760

(22) Filed: Jun. 5, 2018

(65) Prior Publication Data

US 2018/0345121 A1 Dec. 6, 2018

Related U.S. Application Data (60) Provisional application No. 62/515,058, filed on Jun. 5, 2017.

(51) Int. Cl.
*A63C 17/01* (2006.01)
*B32B 5/18* (2006.01)
*B32B 27/40* (2006.01)
*B32B 27/12* (2006.01)
*B32B 5/26* (2006.01)
*B32B 5/24* (2006.01)

(52) U.S. Cl.
CPC .......... *A63C 17/012* (2013.01); *A63C 17/015* (2013.01); *B32B 5/18* (2013.01); *B32B 5/245* (2013.01); *B32B 5/26* (2013.01); *B32B 27/12* (2013.01); *B32B 27/40* (2013.01); *B32B 2250/05* (2013.01); *B32B 2250/40* (2013.01); *B32B 2262/101* (2013.01); *B32B 2262/106* (2013.01); *B32B 2266/0278* (2013.01); *B32B 2305/022* (2013.01); *B32B 2605/00* (2013.01)

(58) Field of Classification Search
CPC ...... A63C 17/01; A63C 17/012; A63C 17/015
See application file for complete search history.

(56) References Cited

U.S. PATENT DOCUMENTS

| 7,138,027 | B1 * | 11/2006 | Canizales | ............. B29C 43/203 156/245 |
| 9,022,398 | B1 * | 5/2015 | Harris | .................... A63C 17/01 280/87.042 |
| 9,403,414 | B2 | 8/2016 | DeFerrari | |

(Continued)

OTHER PUBLICATIONS

The Official Hamboards Webstore, Hamboards Signature Series, https://hamboards.com/collections/signature-series, accessed Jun. 4, 2018, 4 pages.

*Primary Examiner* — Brian L Swenson
(74) *Attorney, Agent, or Firm* — SoCal IP Law Group LLC; Guy Cumberbatch (57) ABSTRACT

An oversized wheeled board and, more particularly, a wheeled board of at least 4 feet in length made of soft, flexible materials. The wheeled board includes a deck having pair of trucks and wheels mounted to an underside, much like a standard skateboard. The oversized deck has a flexible laminated construction of multiple layers that provide enhanced ridability, including fiberglass layers, and may have a layer of a softer material such as foam or urethane. The wheeled board can be ridden on the street much like a wakeboard on the water, and will accommodate carving and other such maneuvers as done when ocean surfing.

17 Claims, 6 Drawing Sheets

(56) References Cited

U.S. PATENT DOCUMENTS

| | | | |
|---|---|---|---|
| 2002/0030338 A1* | 3/2002 | Bert | A63C 17/01 |
| | | | 280/87.041 |
| 2003/0102650 A1* | 6/2003 | Gordon | A63C 17/01 |
| | | | 280/610 |
| 2003/0173384 A1 | 9/2003 | Clark et al. | |
| 2004/0140633 A1* | 7/2004 | Beedle | A63C 17/0046 |
| | | | 280/11.27 |
| 2005/0134013 A1* | 6/2005 | Wright | A63C 17/0046 |
| | | | 280/87.042 |
| 2006/0049596 A1* | 3/2006 | Hill | A63C 17/01 |
| | | | 280/87.042 |
| 2011/0221150 A1* | 9/2011 | Harris | A63C 17/0093 |
| | | | 280/87.042 |
| 2011/0223821 A1 | 9/2011 | Chi | |
| 2012/0121848 A1* | 5/2012 | Gold | B32B 1/04 |
| | | | 428/76 |
| 2013/0049317 A1 | 2/2013 | Cheek | |
| 2013/0328280 A1 | 12/2013 | Meyer | |
| 2017/0136718 A1* | 5/2017 | Chang | B29C 70/745 |
| 2017/0144056 A1* | 5/2017 | Evans | A63C 17/015 |
| 2017/0282051 A1* | 10/2017 | Meyer | A63C 17/012 |

* cited by examiner

TERRESTRIAL WAKEBOARD

RELATED APPLICATION INFORMATION

This patent claims priority from the following provisional patent application: Provisional Patent Application No. 62/515,058, entitled TERRESTRIAL WAKEBOARD, filed Jun. 5, 2017.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to an oversized wheeled board and, more particularly, to a wheeled board of at least 4 feet in length and having a deck made of soft materials.

Description of the Related Art

Various skateboards have been proposed and implemented for sport and recreational purposes. Today's skateboards are either designed for high performance tricks, such as the short skateboard, or they are designed for cruising on, such as the long board skateboard. Most standard skateboards are no more than 33" long and 10" wide. Longer skateboards are not designed for carving and other such maneuvers as done when ocean surfing, as they lack stability and are too rigid. Moreover, they are thin and prone to breakage, and largely unable to perform traditional stunts and maneuvering.

SUMMARY OF THE INVENTION

According to exemplary embodiments, an oversized wheeled board and, more particularly, a wheeled board of at least 4 feet in length and having a deck made of soft materials is disclosed. The wheeled board can be ridden on the street much like a wakeboard on the water. The optimal board for the first time or beginner rider, while avid riders and enthusiasts will feel like they are on the water.

A first oversized wheeled board of the present application comprises a deck having a length of between about 48-60 inches and a maximum width of between about 15-20 inches, the deck being formed of layers of flexible material including multiple layers of fiber glass adhered together. A pair of trucks having wheels is secured below the deck with a riser plate made of an elastomer positioned above each truck between the truck and the deck. A plurality of fasteners secure the trucks and riser plates to a lower surface of the deck, the fasteners each passing through one of the riser plates.

The first wheeled board includes at least one soft middle layer of foam or urethane in the deck. The layers of flexible material may include top and bottom layers of carbon fiber. Also, there may be at least four layers of fiber glass between the top and bottom layers of carbon fiber and a single layer of polymer material located in the middle of the at least four layers of fiber glass. Preferably, there are at least nine total layers.

Preferably, the fasteners extend downward through holes in the deck, risers and a mounting plate of each truck and are secured below the mounting plate with nuts, and the deck has countersunk holes therein so that a head of each fastener lies flush with or below a top surface of the deck.

A second oversized wheeled board comprises a deck having a length of between about 48-60 inches and a maximum width of between about 15-20 inches, the deck being formed of layers of flexible material adhered together including a soft layer made of a foam or urethane. A pair of trucks having wheels is secured below the deck with a pair of reinforcing plates positioned on an upper surface of the deck and a pair of riser plates positioned above each of the trucks. A plurality of fasteners securing the trucks to a lower surface of the deck, the fasteners each passing through one of the reinforcing plates and one of the riser plates.

The layer of foam or urethane is preferably a middle layer. The layers of flexible material may include top and bottom layers of carbon fiber. In one embodiment, there are at least four layers of fiber glass between the top and bottom layers of carbon fiber and the layer of foam or urethane is located in the middle of the at least four layers of fiber glass. Desirably, there are at least nine total layers.

In the second wheeled board, the fasteners extend downward through holes in the deck, risers and a mounting plate of each truck and are secured below the mounting plate with nuts, and the deck has recesses formed in a top surface sized to receive the reinforcing plates and the reinforcing plates have a thickness that is equal to or less than a depth of the recesses so as to remain flush with or below the top surface of the deck.

In either the first or second wheeled board, the riser plate has a thickness of between about 25-35 mm and is preferably an elastomer, but may also be constructed of aluminum. Further, the riser plate preferably has a length of between about 75-85 mm and a width of between about 55-65 mm. Each truck has a mounting plate thereon that contacts and lies flush against an associated riser plate, and has a wheel axle of between about 200-210 mm in length. There are typically two wheels mounted on the wheel axle of each of the trucks, and each wheel has a width of between about 65-75 mm and a diameter of between about 50-60 mm.

Other features and characteristics of the present invention, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

Furthermore, unless otherwise stated, any specific dimensions mentioned in this description are merely representative of an exemplary implementation of a device embodying aspects of the invention and are not intended to be limiting.

The present application provides an oversized wheeled board which combines a highly soft and flexible deck with wheels. Most skateboards, even larger ones, have relatively rigid decks made of materials such as bamboo and plyboard. The decks of the wheeled boards described herein are formed of layers of flexible materials adhered together to provide a highly flexible laminated construction. The flexible materials may be carbon fiber, fiberglass, foam or urethane, or other fiber-reinforced polymers. The flexible laminated construction of the deck provides added flexibility which provides certain advantages for the street surfer. Riders understand immediately that this board is by far the smoothest, most flexible, and enjoyable; the Rolls Royce of boards.

Figure 1:
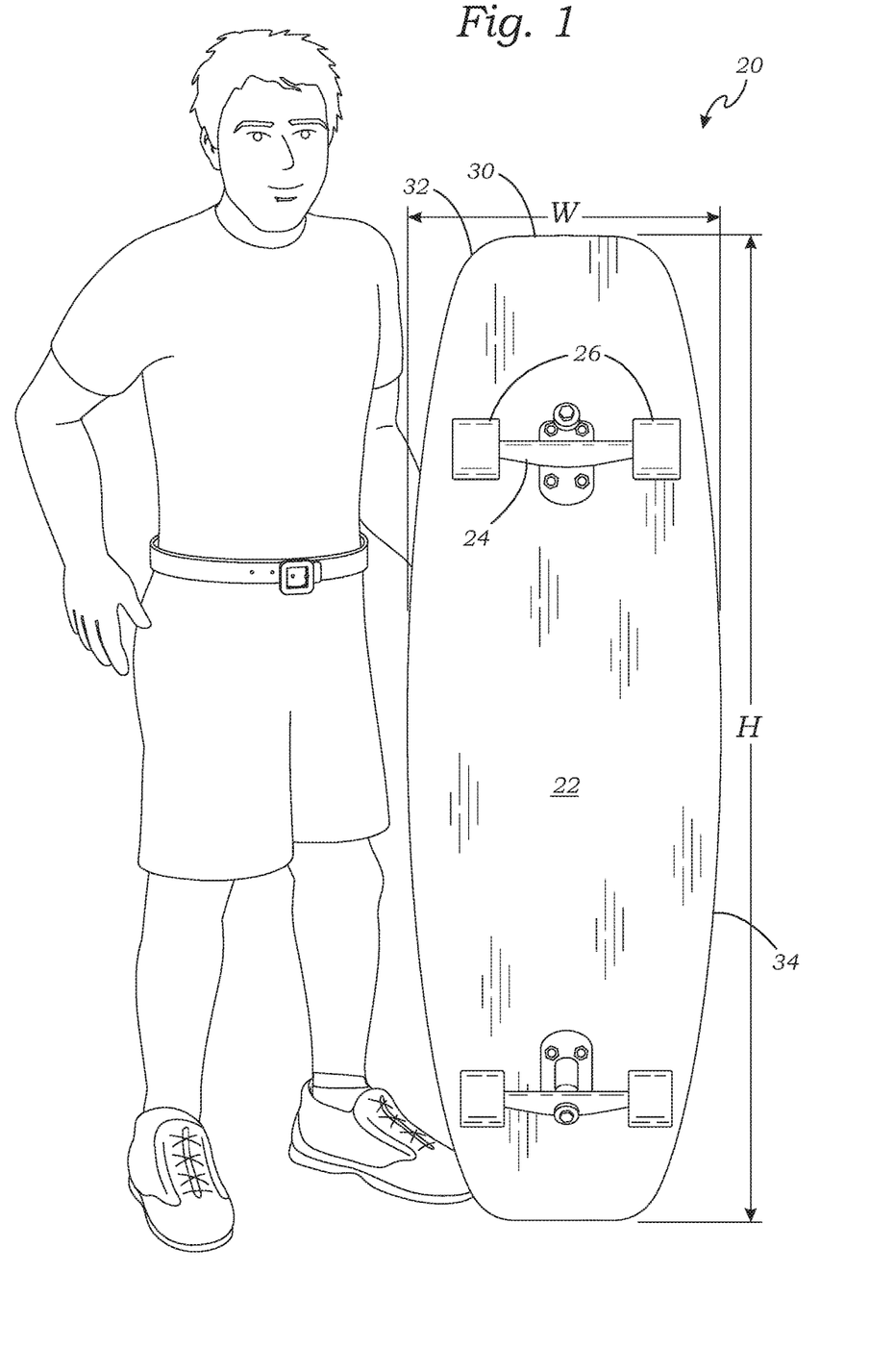
FIG. 1 is a front view of a user holding a wheeled board of the present application so as to show the underside.

FIG. 1 is a front view of a user holding a wheeled board 20 of the present application so as to show the underside thereof. The board 20 includes an oversized deck 22 with a pair of trucks 24 mounted on the underside that support a plurality of wheels 26. As with conventional skateboards, there are preferably four wheels 26 and two trucks 24 as shown, though more wheels per truck may also be utilized.

The deck 22 has a height H of at least 4 feet in length, such as between about 48-60 inches, and a maximum width W of between about 15-20 inches. In a preferred embodiment, the height H is about 55 inches, and the maximum width W is about 17 inches. The deck 22 has generally straight end edges 30, four rounded corners 32, and gently convex side edges 34. The maximum width W is located approximately midway between the two end edges 30, and the widths of the end edges 30 is thus less than the maximum width W. Preferably, the end edges 30 have a smaller width of between about 9-12 inches, more preferably about 10 inches. Although these dimensions are preferred, the deck 22 may be shaped more like an oval, with more tapered ends, or have wider end edges 30 so as to be more rectangular.

Figure 2A:
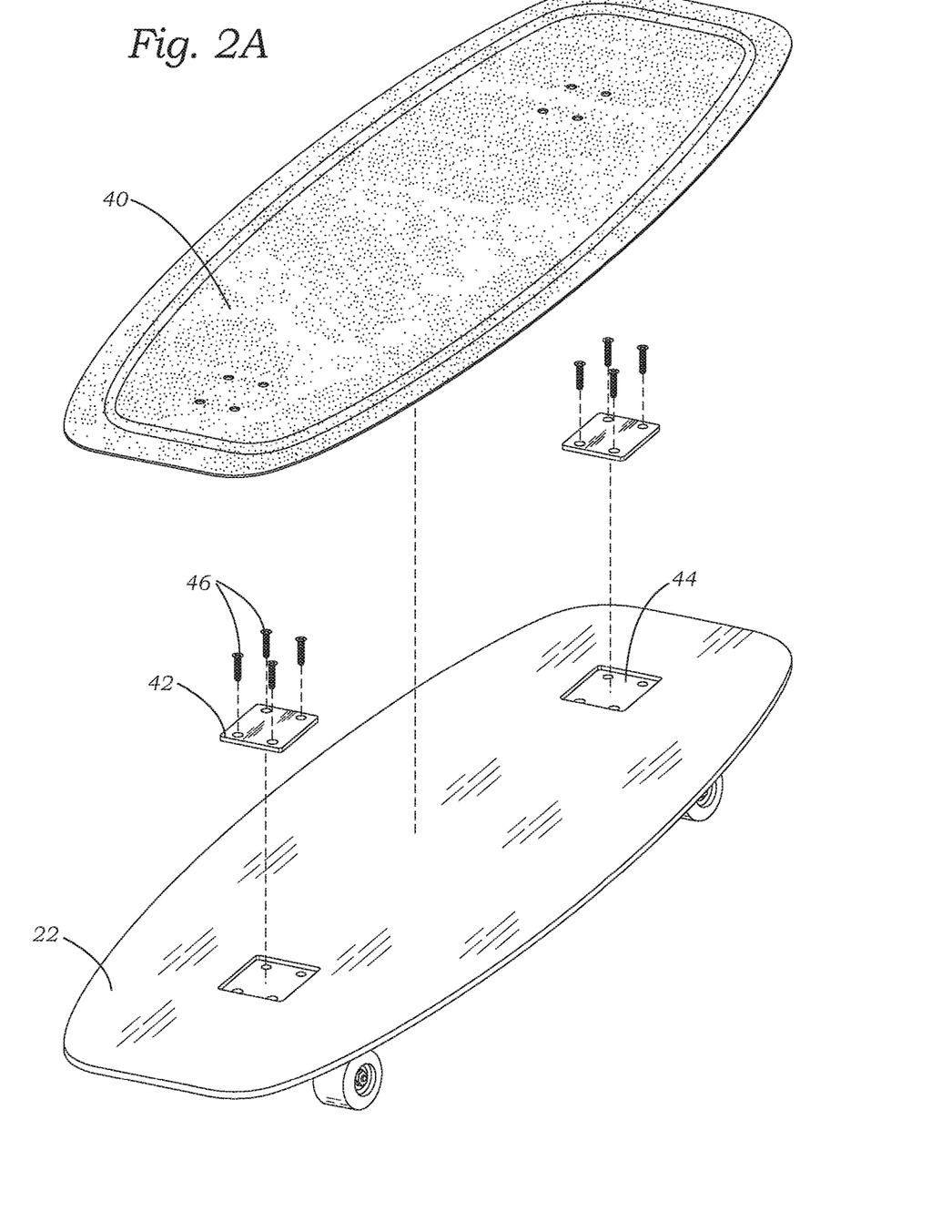
FIG. 2A is a perspective exploded view of upper components of the wheeled board.

FIG. 2A is a perspective exploded view of upper components of the wheeled board 20. A grip material layer 40 may be provided on the upper surface of the deck 22. Preferably the grip material layer 40 has a sandpaper like quality on its upper face and adhesive on its lower face, and is sized to cover the entire deck 22. A pair of reinforcing plates 42 fit within complementary recesses 44 formed in the upper surface of the deck 22. The plates 42 desirably have a thickness that is equal to or less than a depth of the recesses 44 so as to remain flush with or below the top surface of the deck 22. A plurality of fasteners 46, such as the four bolts shown, extend downward through the reinforcing plates 42 and attached to complementary mounting structure to hold the trucks 24 in place, as will be described below. The fasteners 46 may be hidden by the grip material layer 40 or pass through holes therein as shown. Preferably, the reinforcing plates 42 have countersunk holes so that heads of the fasteners 46 are flush with or below the top surface of the plates.

Figure 2B:
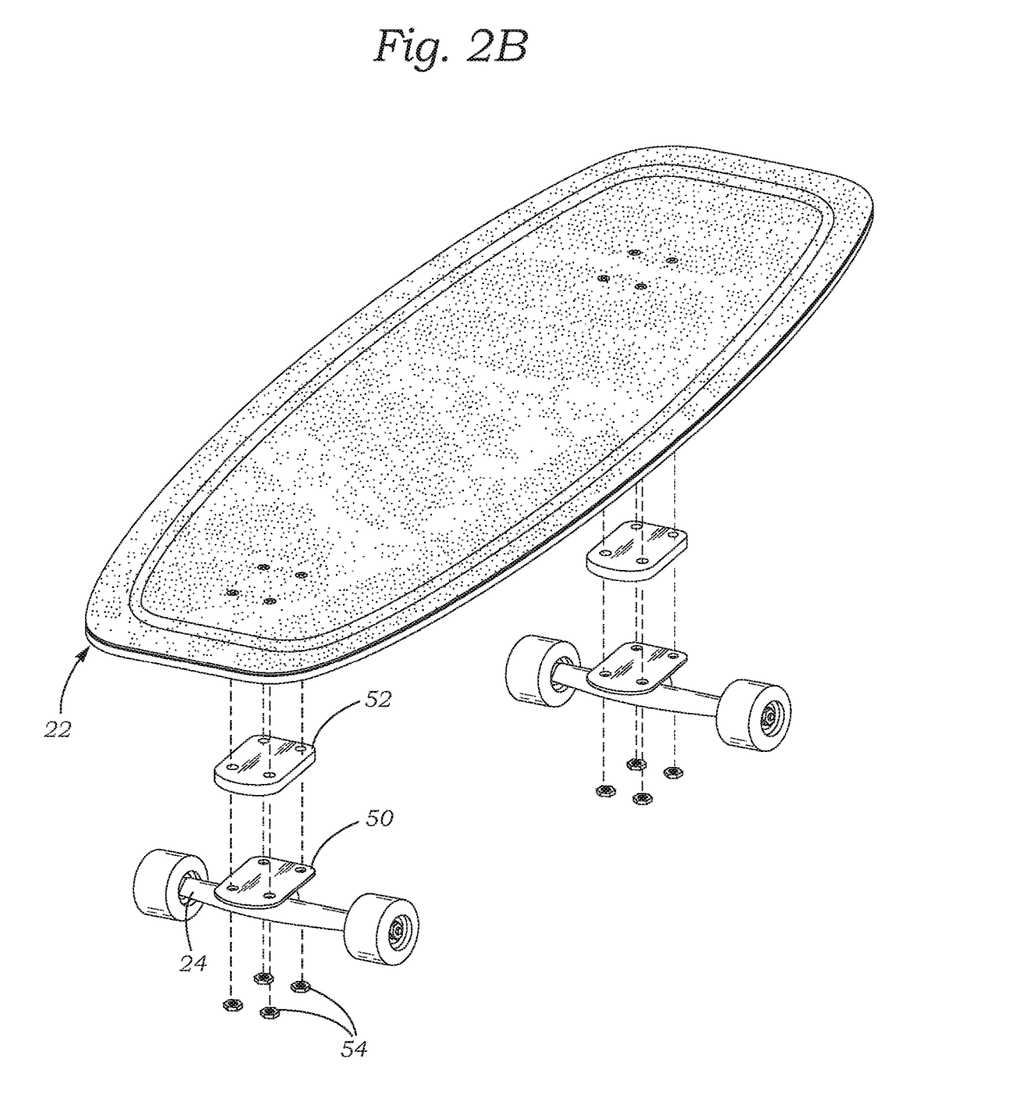
FIG. 2B is a perspective exploded view of lower components of the wheeled board.

FIG. 2B is a perspective exploded view of lower components of the wheeled board 20 illustrating each of the trucks 24 having a mounting plate 50 thereon spaced below a riser plate 52. Both of mounting plates 50 and the riser plates 52 have aligned holes through which the fasteners 46 that extend down through the deck 22 pass. Complementary mounting structure such as locking nuts 54, as shown, secure to the fasteners 46 to hold the assembly in place, and the trucks 24 on the underside of the deck 22.

Figure 3:
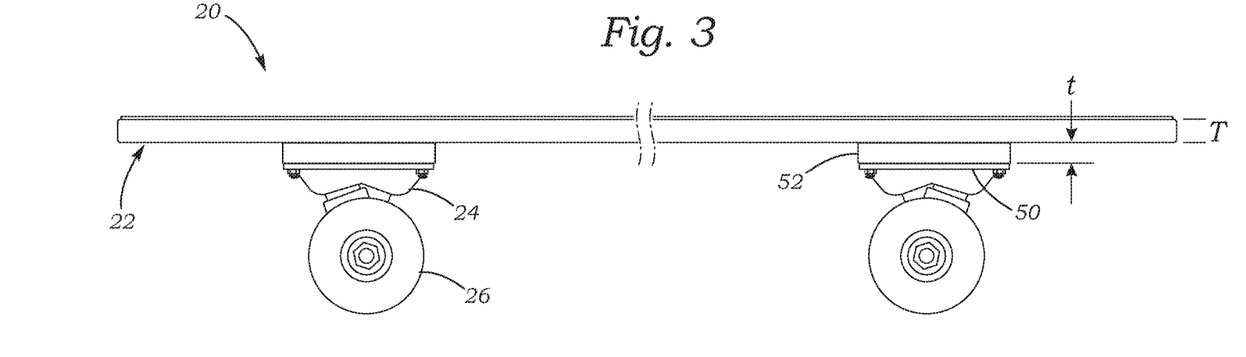
FIG. 3 is a side elevation view, partially cutaway, of the wheeled board.

FIG. 3 is a side elevation view, partially cutaway, of the wheeled board 20 showing a thickness T of the deck 22 as well as a thickness t of one of the riser plates 52. In a preferred embodiment, the deck thickness T is between about ¾-1 inches, and more preferably is closer to 1 inch. The riser plates 52 have a thickness t of between about ¾-1 inches.

The riser plates 52 are preferably elastomeric (e.g., rubber) so that they act as shock absorbers between the mounting plates 50 and the underside of the deck 22 and enhance the overall flexibility of the board 20. This enables carving and other such maneuvers as done when ocean surfing, unlike conventional skateboards that lack stability and are too rigid. The riser plates 152 may also made of a lightweight metal such as aluminum.

The trucks 24 are desirably oversized which will allow the rider to make tighter turns without experiencing "wheel bite." Stiffer trucks can compensate a little but the presence of the riser plate 52 keeps the wheels from contacting the underside of the deck 22.

Figure 4:
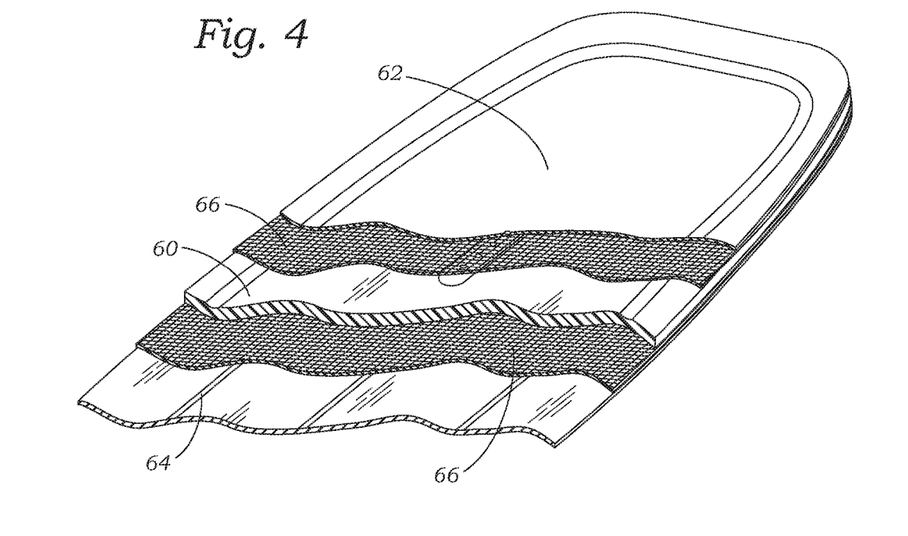
FIG. 4 is a partial perspective view of a deck of the wheeled board showing layers cut away to illustrate preferred constructional details.

FIG. 4 is a partial perspective view of a deck of the wheeled board 20 showing layers cut away to illustrate preferred constructional details. Preferably, the majority of the thickness of the deck 22 comes from a middle layer 60 of relatively soft material such as foam or urethane. An upper outer layer 62 and a lower outer layer 64 are sandwiched around the middle layer 60 with intermediate layers 66 of epoxy or other adhesive therebetween. The upper and lower outer layers 62 may be formed of a variety of firmer materials, such as various fiberglass, polyester, or other such easily molded products.

Figure 5:
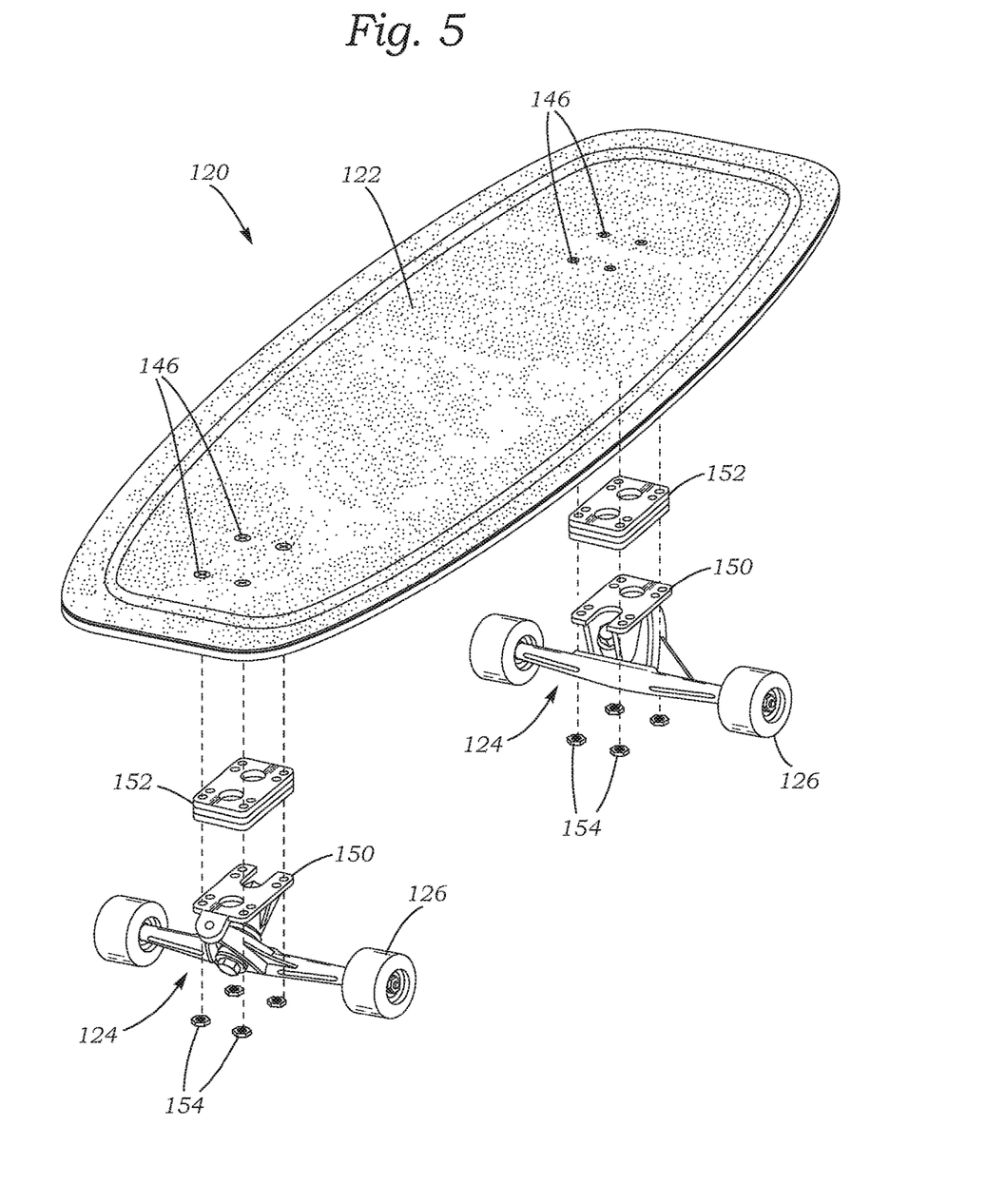
FIG. 5 is a perspective exploded view of lower components of an alternative wheeled board.

FIG. 5 is a perspective exploded view of lower components of an alternative wheeled board 120 of the present application. The board 120 includes an oversized deck 122 with a pair of trucks 124 mounted on the underside that support a plurality of wheels 126. As with conventional skateboards, there are preferably four wheels 126 and two trucks 124 as shown, though more wheels per truck may also be utilized.

The trucks 124 each having a flat mounting plate 150 thereon spaced below an elastomeric riser plate 152, with aligned holes through which fasteners 146 that extend down through the deck 122 pass. Complementary mounting structure such as locking nuts 154, as shown, secure to the fasteners 146 to hold the assembly in place, and the trucks 124 on the underside of the deck 122.

Figure 6:
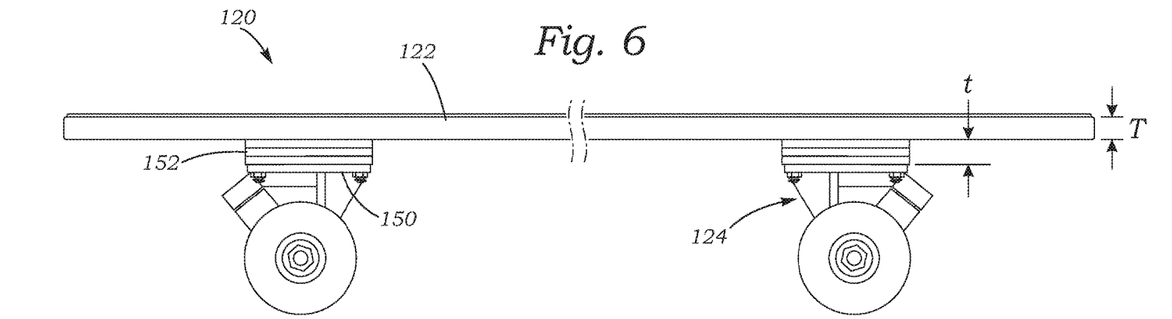
FIG. 6 is a side elevation view, partially cutaway, of the alternative wheeled board.

FIG. 6 is a side elevation view, partially cutaway, of the wheeled board 120 showing a thickness T of the deck 122 as well as a thickness t of one of the riser plates 152. In a preferred embodiment, the deck thickness T is between about ¾-1 inches, and more preferably is closer to 1 inch. The riser plates 152 have a thickness t of between about 25-35 mm (~1-1.5 inches). In addition, each riser plate 152 has a length of between about 75-85 mm and a width of between about 55-65 mm, and are generally sized about the same as the adjacent mounting plate 150. The riser plates 152 are relatively thicker than traditional risers and are preferably elastomeric (e.g., rubber) so that they act as shock absorbers between the mounting plates 150 and the underside of the deck 122 and enhance the overall flexibility of the board 120. This enables carving and other such maneuvers as done when ocean surfing, unlike conventional skateboards that lack stability and are too rigid. The riser plates 152 may also made of a lightweight metal such as aluminum.

The trucks 124 are desirably oversized, which will allow the rider to make tighter turns without experiencing "wheel bite." Stiffer trucks can compensate a little but the presence of the riser plate 152 keeps the wheels from contacting the underside of the deck 122. The trucks each have a wheel axle of between about 200-210 mm in length. In the exemplary embodiment, there are two wheels mounted on the wheel axle of each of the trucks, and each wheel has a width of between about 65-75 mm and a diameter of between about 50-60 mm.

Figure 7:
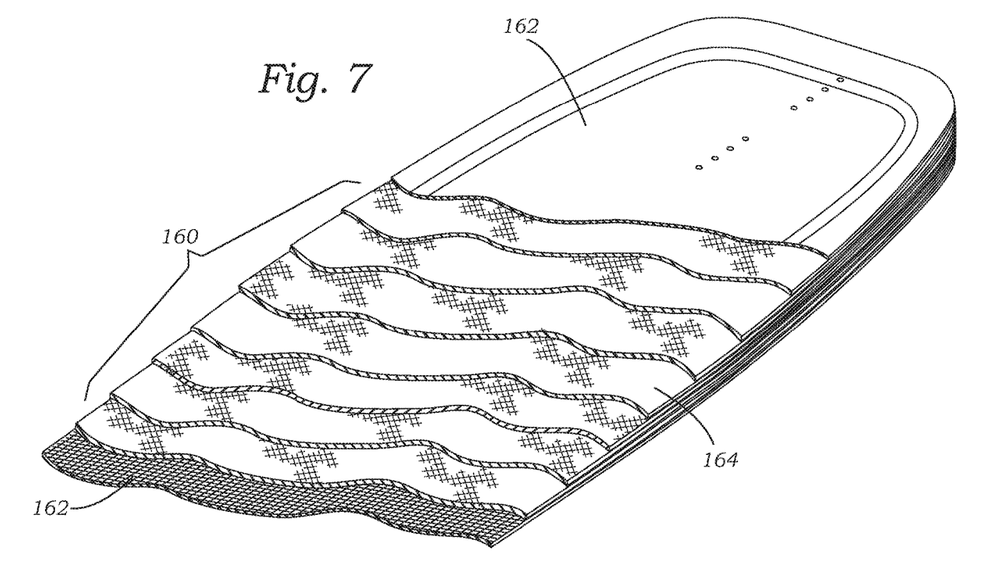
FIG. 7 is a partial perspective view of a deck of the alternative wheeled board showing layers cut away to illustrate preferred constructional details.

FIG. 7 is a partial perspective view of a deck of the wheeled board 120 showing layers cut away to illustrate preferred constructional details. Preferably, a plurality of middle layers 160 of flexible material are sandwiched together and adhered with epoxy or other adhesive. The plurality of middle layers 160 may be fiberglass or polyester. Upper and lower outer layers 162 may be formed of a variety of firmer materials, such as carbon fiber. A central layer 164 of a polymer is included, and may be a relatively soft material such as foam or urethane. In a preferred embodiment, there are at least four middle layers 160, and a total of at least nine layers overall. Also, all of the layers except the middle layer 164 are desirably about the same thickness, with the middle layer being thinner. For example, there may be eight layers each contributing about 12.5% of the total thickness, with a very thin middle layer 164.

Closing Comments

Throughout this description, the embodiments and examples shown should be considered as exemplars, rather than limitations on the apparatus and procedures disclosed or claimed. Although many of the examples presented herein involve specific combinations of elements, it should be understood that those elements may be combined in other ways to accomplish the same objectives. Elements and features discussed only in connection with one embodiment are not intended to be excluded from a similar role in other embodiments.

It is claimed:

1. An oversized wheeled board, comprising:
   a deck having a length of between about 48-60 inches and a maximum width of between about 15-20 inches, the deck being formed of at least nine total layers of flexible material including a soft layer made of a foam or urethane and multiple layers of fiber glass adhered together, wherein none of the layers are bamboo or plyboard;
   a pair of trucks having wheels;
   a riser plate made of an elastomer positioned above each truck between the truck and the deck; and
   a plurality of fasteners securing the trucks and riser plates to a lower surface of the deck, the fasteners each passing through one of the riser plates, wherein the fasteners extend downward through holes in the deck, risers and a mounting plate of each truck and are secured below the mounting plate with nuts, and wherein the deck has recesses formed in a top surface sized to receive reinforcing plates having a thickness that is equal to or less than a depth of the recesses so as to remain flush with or below the top surface of the deck, and the fasteners each passing through one of the reinforcing plates.

2. The wheeled board of claim 1, wherein the layers of flexible material include top and bottom layers of carbon fiber.

3. The wheeled board of claim 1, wherein there are at least four layers of fiber glass and the soft layer made of a foam or urethane is located in the middle of the at least four layers of fiber glass.

4. The wheeled board of claim 3, wherein there are eight layers of fiber glass.

5. The wheeled board of claim 1, wherein the riser plate has a thickness of between about 25-35 mm.

6. The wheeled board of claim 5, wherein the riser plate has a length of between about 75-85 mm and a width of between about 55-65 mm.

7. The wheeled board of claim 1, wherein each truck has a mounting plate thereon that contacts and lies flush against an associated riser plate, and a wheel axle of between about 200-210 mm in length.

8. The wheeled board of claim 7, wherein there are two wheels mounted on the wheel axle of each of the trucks, and each wheel has a width of between about 65-75 mm and a diameter of between about 50-60 mm.

9. An oversized wheeled board, comprising:
   a deck having a length of between about 48-60 inches and a maximum width of between about 15-20 inches, the deck being formed of at least four middle layers of flexible material adhered together including a soft layer made of a foam or urethane, wherein none of the layers are bamboo or plyboard;
   a pair of trucks having wheels;
   a pair of riser plates positioned above each of the trucks; and
   a plurality of fasteners securing the trucks to a lower surface of the deck, the fasteners each passing through one of the riser plates, wherein the fasteners extend downward through holes in the deck, risers and a mounting plate of each truck and are secured below the mounting plate with nuts, and wherein the deck has recesses formed in a top surface sized to receive reinforcing plates having a thickness that is equal to or less than a depth of the recesses so as to remain flush with or below the top surface of the deck, and the fasteners each passing through one of the reinforcing plates.

10. The wheeled board of claim 9, wherein the layer of foam or urethane is a middle layer.

11. The wheeled board of claim 9, wherein the layers of flexible material include top and bottom layers of carbon fiber.

12. The wheeled board of claim 9, wherein there are at least four layers of fiber glass and the layer of foam or urethane is located in the middle of the at least four layers of fiber glass.

13. The wheeled board of claim 12, wherein there are eight layers of fiber glass and the middle layer of foam or urethane.

14. The wheeled board of claim 9, wherein the riser plate has a thickness of between about 25-35 mm.

15. The wheeled board of claim 14, wherein the riser plate has a length of between about 75-85 mm and a width of between about 55-65 mm.

16. The wheeled board of claim 9, wherein each truck has a mounting plate thereon that contacts and lies flush against an associated riser plate, and a wheel axle of between about 200-210 mm in length.

17. The wheeled board of claim 16, wherein there are two wheels mounted on the wheel axle of each of the trucks, and each wheel has a width of between about 65-75 mm and a diameter of between about 50-60 mm.

\* \* \* \* \*